Nov. 24, 1959 A. S. HILL 2,914,607

FACSIMILE PHASING AND REPEATING SYSTEM

Filed Dec. 27, 1957 3 Sheets-Sheet 1

INVENTOR.
A. S. HILL
BY
W F Presson
ATTORNEY

Nov. 24, 1959 A. S. HILL 2,914,607

FACSIMILE PHASING AND REPEATING SYSTEM

Filed Dec. 27, 1957 3 Sheets-Sheet 2

INVENTOR.
A. S. HILL

BY [signature]

ATTORNEY

FACSIMILE PHASING AND REPEATING SYSTEM

Filed Dec. 27, 1957 3 Sheets-Sheet 3

INVENTOR.
A. S. HILL
BY V. C. Presson
ATTORNEY

United States Patent Office 2,914,607

Patented Nov. 24, 1959

2,914,607

FACSIMILE PHASING AND REPEATING SYSTEM

Archie S. Hill, Metuchen, N.J., assignor to The Western Union Telegraph Company, New York, N.Y., a corporation of New York Application December 27, 1957, Serial No. 705,521

12 Claims. (Cl. 178—6.6)

This invention relates to an automatic phasing and repeating system for operatively connecting a facsimile transmitter to a facsimile recorder for transmission of messages thereto over a communication circuit, and in which the transmitting and recording scanning elements of the two machines are not in phase with each other.

In the facsimile method of telegraphy the scanning element of the transmitter and the marking element of the recorder must be, at all times, in the same relative positions on the subject matter copy being transmitted and on the sheet on which the transmitted matter is reproduced. This requirement is usually met by driving connected facsimile machines by A.C. power supplies that are mutually synchronous and by starting all machines in phase for each transmission. In most large cities a considerable portion of a telegraph company's terminal handling operations, i.e., the delivery of messages from distant cities to local addresses and the acceptance from local senders of messages to distant cities, are conducted by the facsimile method of telegraphy over private lines connecting each subscriber with the central telegraph office.

In the interest of economy in the first cost and also in maintenance, the machines furnished in large numbers on customers' premises are of the simplest possible design and may be used both to transmit and receive. Such machines are well known in the art, for example, transceivers of the type disclosed in U.S. patent to Wise et al. No. 2,718,547, issued September 20, 1955, when connected with a main office. The customer's machine draws no power on standby. When it is turned on either as a transmitter or receiver it takes about five seconds for its tubes to heat up sufficiently to be operable. When the tubes become normally conductive, a shunt is automatically removed from a pair of contacts in series with the D.C. simplex line, which contacts are momentarily opened once during each revolution of the message drum, all in known manner. The momentary line openings constitute the pulses to which the central office machines are phased. These phasing pulses continue throughout the transmission of a message in either direction. These continuous phasing pulses also normally serve purposes which need not be explained here.

The customers' machines are ordinarily operable only in connection with specially designed central office equipment. There are situations, however, in which quasi-direct transmission from one customer's machine to another is needed. The invention disclosed herein may advantageously be employed to meet that need.

In accordance with the invention, when a message blank bearing subject copy to be sent from a calling station A is placed on the drum of a facsimile transmitter, or the transmitting portion of a transceiver, at that station, the attendant there transmits a designation signal, for example, a number, which identifies a desired facsimile station B to which the message is to be transmitted, and then depresses a start button or key. At the central switching office the incoming designation signal is displayed on an indicator, whereupon the operator at the central station connects the repeater and phasing equipment to the lines of stations A and B, usually by means of switchboard plug and jack connections. A signal device at the called station is then energized to notify station B that a calling station A has a message to transmit, whereupon the attendant at station B places a recording blank on the recording drum of the facsimile transceiver, and presses a starting button or key. The phasing pulses transmitted by the facsimile machines at the calling and called stations cause the machines to phase with respect to signal storing and reproducing apparatus at the central station, although the calling and called machines are nonphasing with respect to each other.

The signal storage and retransmitting apparatus at the central station includes a magnetic signal storage member, such as a rotatable drum, disk, wheel, or an endless tape, having a magnetizable surface, with an associated recording head for temporarily recording and storing relatively small portions of the facsimile message signals continuously as they are received from the calling station, and a reproducing head for continually transmitting the stored signals to the called station. The spacing of the recording and reproducing heads relative to each other around the periphery or recording track of the magnetic storage member, and hence the portion of the message stored at any instant, is automatically determined by the difference in phase between the facsimile machines at the calling and called stations, thus providing in effect a variable signal delay line.

In the embodiments illustrated herein, the positions of the recording and readout heads preferably will be such that the segment or length of the magnetic storage member extending from the recording head to the readout head is of a magnitude such that at the speed of travel of the recording surface of the storage member, the time required for a given magnetized spot on the member to move from the recording head to the readout head is equal to the time required by the calling station transmitter to trace one scanning line across a subject-copy sheet plus the amount of time by which the phasing pulses from the called station lag the phasing pulses from the calling station. The result is that the message in transit is phased with the facsimile machine which is transmitting as well as with the facsimile machine that is recording it.

An object of the invention is to provide a repeating and a phasing system for operatively connecting a facsimile transmitter and a facsimile receiver which do not phase with each other, with intermediate storage of the facsimile message signals for a duration determined by the phase difference between the transmitter and receiver.

A further object is the provision of a facsimile repeating and phasing system in which incoming facsimile message signals from a facsimile transmitter are temporarily stored on a magnetic storage medium and are retransmitted to a facsimile recorder as they are being received from the transmitter, with a time delay sufficient to compensate for the phase difference between the scanning elements of the facsimile transmitter and the facsimile recorder, so that the two machines do not have to be in phase with each other.

Another object is a system of the foregoing character in which the effective length of the magnetic storage medium between the recording and readout heads associated therewith is automatically adjusted to provide a variable signal delay to compensate for the phase difference between the facsimile transmitter and the facsimile recorder.

Other objects and advantages will be apparent from the following detailed description of an illustrative embodiment of the invention taken in connection with the accompanying drawings in which.

Figure 1:
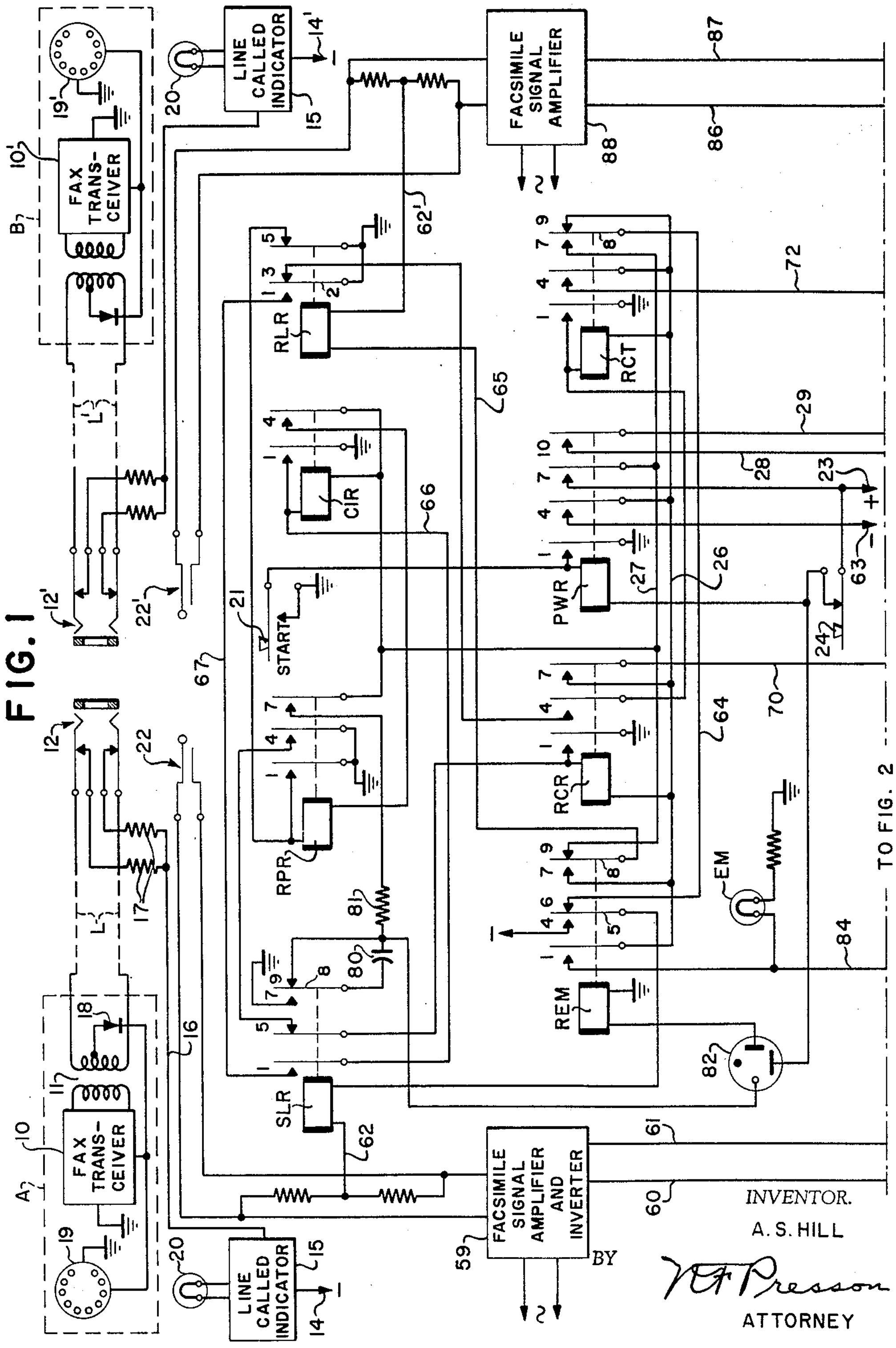
Fig. 1 is a schematic circuit drawing showing two outlying facsimile stations with intervening central switching and repeating apparatus.

In the drawings all instruments are depicted in the standby condition with all relays and magnets deenergized and rotatable parts at a standstill, and negative standby potential is applied to the lines which connect the outlying stations to the central station. The amplifiers of the system are continuously powered. Assume, for the purpose of explanation, that a facsimile transceiver 10 at station A of Fig. 1 desires to call and send a message to a facsimile transceiver 10' at station B. As above stated, the transceivers may be of any suitable type known in the art, but preferably are of the type shown in the aforesaid Wise et al. U.S. Patent 2,718,547. Each facsimile transceiver is connected by means of a transformer 11 and a communication line L or L' to the springs of a switchboard jack 12 or 12' at the central station, each switchboard jack being individual to a particular station. Each outlying station also has a dial or equivalent device 19 or 19' whereby the station may send to the central station a number assigned to the desired station to which the message is to be sent. The circuit from the dial 19 of station A, for example, includes a rectifier 18 and a simplex circuit comprising the right hand winding of transformer 11, line L, closed springs of the switchboard jack 12, resistances 17, conductor 16 to a line called indicator 15 at the central station, and thence to a source 14 of negative standby battery. The indicator 15 may be of any suitable type that may be operated by dial or equivalent pulses, for example, an electromagnetic indicator of the type well known in the art and having one, two or more digit indicator wheels for indicating a one, two or three digit number, as the case may be. Associated with the indicator 15 is a signal device, such as a lamp 20, which indicates to the attendant at the central station that the indicator has received the number of a desired station to which station A wishes to transmit a facsimile message. The line indicator may be of the type that is restored to normal after each call has been received, and the lamp 20 arranged to be lit whenever the indicator dial of the lowest denominational order moves from its home or "blank" position, all in known manner.

After placing a message on the transmitting drum of his transceiver, the attendant at station A will dial the number assigned to station B and then press a "send" button in his transceiver such as shown in the aforesaid Wise et al. U.S. patent. No further action is required of the calling station A during transmission or at its conclusion except to remove the "sent" message blank from his machine. At the central switching station the calling lamp 20 will light and the "line called" indicator 15 will show the number of the line to which the calling station desires to be connected. The attendant at the central station will then insert a repeater input plug 22 of the phaser-repeater into the line jack 12 connected to the calling station A and the phaser-repeater output plug 22' into the line jack 12' connected to the called station B, and press a start button 21. The insertion of the plug 22' into line jack 12' opened the normal jack contacts and thereby removed the negative standby battery 14' from the line L'. From then on all operations of the phaser-repeater are performed automatically until the message transmission has been completed.

Figure 2:
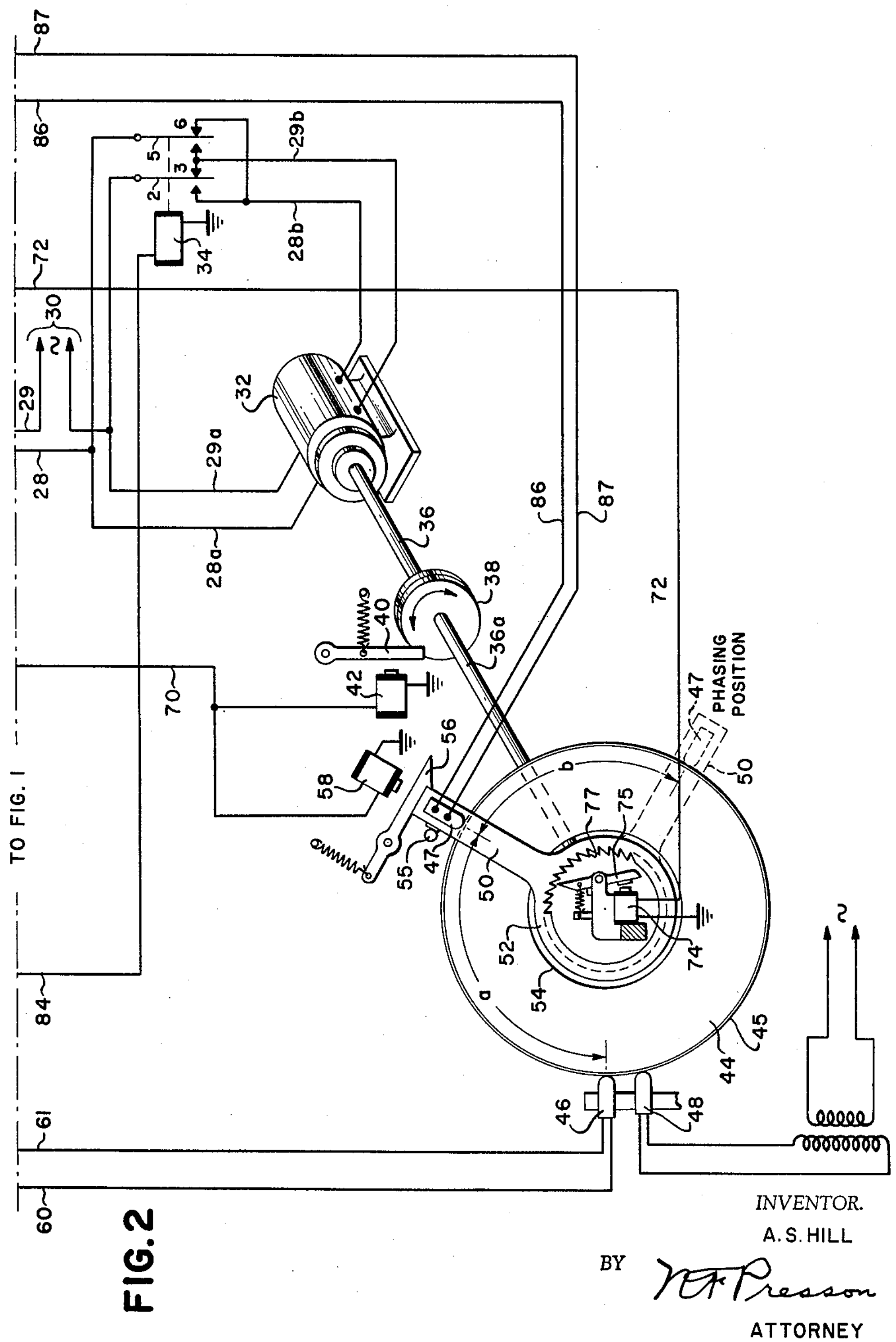
Fig. 2 shows the central storing and retransmitting apparatus associated with Fig. 1.

When the start button 21 was pressed a power relay PWR was operated by current flowing from a source 23 of positive direct current potential power supply, through the closed contacts of an end-of-message push button 24, and the winding of PWR to ground at the start button 21. The PWR relay remains operated by the closing of its contacts 1 and thus is locked up by current flowing from source 23 through contacts of the end-of-message button 24 and the winding of PWR to ground. Also, the operation of PWR, at its contacts 4 and 7 applies negative and positive direct current potentials, respectively, to a plurality of points in preparation for succeeding operations, and at its contacts 10 applies A.C. power from source 30, Fig. 2, over conductors 28 and 29 and thence over conductors **28*a* and 29*a* to the stator winding of a reversible synchronous motor 32. In the case of a facsimile drum speed of 180 r.p.m. customarily employed, the motor 32 will be a 60 r.p.m. type. Armatures 2 and 5 and contacts 3 and 6 of a deenergized relay 34, Fig. 2, apply the alternating current power over conductors 28*b* and 29*b* to the rotor winding of the synchronous motor 32, causing the motor to rotate its shaft 36** in a clockwise direction as viewed in the figure.

On the shaft 36 is mounted a friction slip clutch 38 which is stopped when the armature 40 of a release magnet 42 falls into the stopping notch of the clutch, as shown in the figure. A shaft **36*a* is under the driving control of the clutch 38, and on the end of the latter shaft is mounted a magnetic storage wheel 44 which is rotatable by the shaft 36*a* when clutch 36 is released. Secured to the periphery of wheel 44 is a magnetic tape 45 on which facsimile signals may be stored magnetically by means of a recording magnet 46, the incoming facsimile signals being amplified and inverted by the unit 59, seen in Fig. 1, and applied over conductors 60 and 61 to the recording head. Also adjacent to the recording surface 45 is a readout head 47 for retransmitting the signals impressed on the magnetic storage surface 45 by the head 46. The readout head is mounted on an arm 50 which extends from a rotatable spider frame member 52**. The arcuate distance (120°), indicated by the curved line *a*, between the recording head 46 and the standby position of the readout head 47, shown in full line, is such that the length of the magnetic tape 45 along the arc *a* will accommodate the facsimile message signals generated by one revolution of the transmitting drum, i.e., one full scanning line across a message sheet at station A; the arcuate distance indicated by the curved line *b* to the moved position of the readout head (47) indicated in dotted outline will never exceed 120°, or one full scanning line. The effective length of the storage track on the tape 47 between the recording and readout heads is thus equal to the initial length established by the standby position of the readout head plus a length determined by the position to which the readout head is rotated in a clockwise direction under control of a phasing pulse from station B in a manner hereinafter described. An erasing magnet 48 is positioned a short distance in advance of the recording head 46 for erasing signals previously recorded on the tape 45.

The spider frame member 52 is mounted so as to be rotated by a friction slip clutch 54 from the shaft **36*a*. A stop pin 55 limits the arcuate movement of the spider arm 50 in a counterclockwise direction as seen in the figure. The arm 50 is engageable by a latch member 56 which is controlled by a release magnet 58**.

When the input and output plugs 22 and 22' of Fig. 1 were inserted in the proper line jacks 12 and 12', the outer jack springs were actuated out of contact with the inner springs and the D.C. simplex paths of the lines extending to stations A and B are transferred from the standby conditions. The line from the calling station A is extended over the simplex circuit 62 through the winding of a relay SLR, and a circuit comprising armature 5 and contact 6 of a relay REM, conductor 64, armature 8 and contact 9 of a relay RCT, and contacts 4 of energized relay PWR to a source 63 of negative potential. The line from the called station B is extended over the simplex circuit 62′, winding of a relay RLR, conductor 65, armature 8 and contact 9 of the relay REM, conductor 27, and contacts 7 of PWR to the source 23 of positive potential, thus applying positive potential to the called line L′ which energizes a calling signal in the facsimile machine at the called station B in known manner. The attendant at station B answers the call by pressing the start button in that machine.

At the first instant, in the operation being described, when relays SLR and RLR are energized by the respective simplex line currents, a cycle initiate relay CIR is operated by current flowing from positive battery on conductor 27, through the winding of CIR, conductor 66, contacts 1 of relay SLR, conductor 67 and contact 1 and armature 2 of RLR to ground. Relay CIR is held energized by the closing of its contacts 1. The closing of contacts 4 of CIR applies positive battery from conductor 27 to one terminal of the winding of a relay RPR.

On the next phasing (open) pulse from the called station B, contacts 5 of relay RLR will momentarily close and operate RPR over a circuit including contacts 4 of CIR, the winding of RPR, and contacts 5 of relay RLR to ground. Relay RPR is locked through its contacts 1 to ground.

On the first phasing (open) pulse received from station A after relay RPR has been energized, a circuit is established from negative battery on conductor 26, through the winding of RCR, contacts 5 of relay SLR, and contacts 4 of RPR, to ground, operating relay RCR which will be locked up by the circuit established through its contacts 1 to ground. The operation of relay RCR establishes a circuit from negative battery on conductor 26, through contact 7 of RCR, conductor 70, and through the release magnets 42 and 58, Fig. 2. The magnets are energized and attract their armatures 40 and 56 respectively and remove the restrictions from the driven plate of clutch 38 and of the arm 50.

The clockwise motion of the motor 32 will then be transmitted through clutch 38 and cause the recording-transmitting wheel 44, its arm 50, and the readout head 47 to rotate in a clockwise direction as seen in the figure.

On the next phasing (open) pulse from station B a circuit is momentarily established from negative battery on conductor 26 (Fig. 1) through the winding of relay RCT, contacts 4 of energized RCR, contact 3 and armature 2 of RLR to ground, causing relay RCT to operate and lock up through its contacts 1 to ground. The closing of contact 7 and armature 8 of RCT removes negative battery obtained from conductor 26 and applies positive battery potential obtained from conductor 27, through conductor 64, to the simplex line 62 to sending station A, causing its machine to start scanning and transmitting. The closing of contacts 4 of RCT established a circuit from negative battery on conductor 26, through the contacts 4 of RCT and conductor 72 through the coil of a magnet 74, Fig. 2, to ground. The armature 75 of the magnet extends as a pawl adapted to engage the teeth 77 of an internal ratchet wheel portion of the spider member 52. The energization of magnet 74 attracts the armature 75 and causes the pawl end thereof to engage a tooth of the internal row 77, causing the spider arm 50 to stop at a position which it maintains throughout transmission of the message.

The position at which the arm 50 stops will be such that the segment of the recording-transmitting wheel 44 from the recording head 46 to the pickup transmitting head 47, extending in the clockwise direction, is of such magnitude that at the speed of rotation of the wheel 44 the time required for a given spot on the magnetizable surface 45 to move from the head 46 to the head 47 is equal to the time required by the transmitting facsimile machine at station A to trace one full scanning line across a message sheet plus the amount of time by which phasing pulses of the receiving station B lag the phasing pulses from the sending station A. This lag may extend over a range of up to 360° in the instantaneous angular position of the transmitting and recording drums. In effect therefore the message in transit is phased with the machine which is transmitting as well as with the machine which is recording it.

Pulsing on both of the line circuits continues throughout the transmission of the message. During the intervals between phasing (open) pulses on the line to station A, armature 8 and contact 7 of relay SLR momentarily close, causing a small charge from positive battery from conductor 27 and contacts 7 of RPR to be applied to a condenser 80, Fig. 1, through a high resistance 81, and armature 8 and contact 7 of SLR to ground. With each open phasing pulse from station A the condenser 80 is discharged through armature 8 and contact 9 of the relay SLR.

Figure 3:
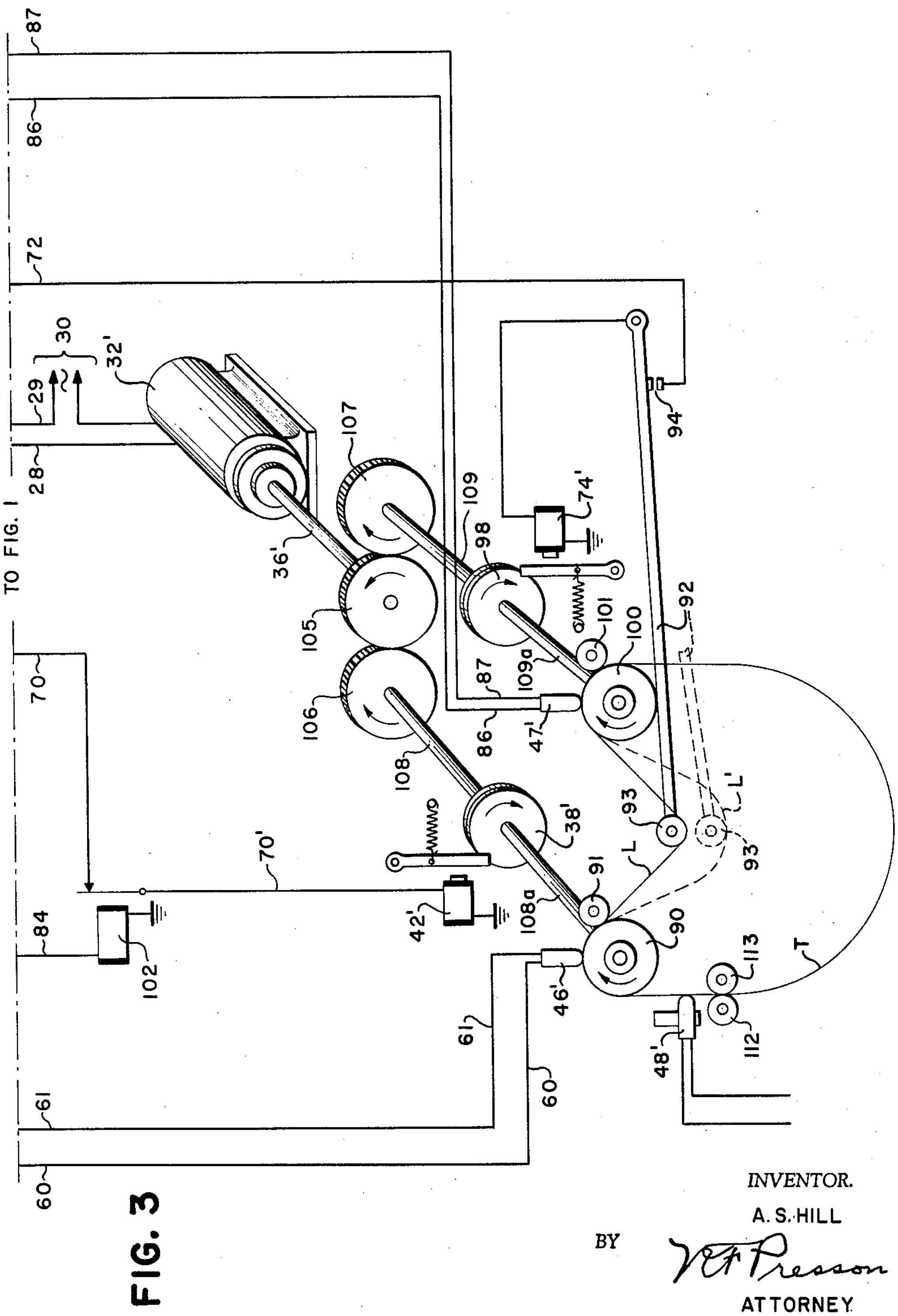
Fig. 3 shows a modification in which an endless magnetic tape is employed as the signal storage member.

Fig. 3 shows a modification in which an endless magnetic tape T is employed for signal storage at the central station, under control of the circuitry of Fig. 1. In this form the synchronous driving motor 32′ need not be of the reversible type since its armature and shaft 36′ are driven only in a counterclockwise direction as viewed in the figure. The shaft 36′ carries a gear 105 which in turn drives meshing gears 106 and 107. Gear 106 drives a shaft 108 which terminates in the driving disc embodied in the friction slip clutch 38′. The driven disc of clutch 38′ drives a shaft 108*a* which in turn drives a tape feed roller 90 having a coacting pressure roller 91. The gear 107 drives a shaft 109 which terminates in the driving disc of a friction slip clutch 98; the driven disc of the friction clutch drives a shaft 109*a* which in turn drives a tape feed roller 100 having a coacting pressure roller 101. If desired, the magnetic tape T may have feed holes perforated therein and the tape drive rollers 90 and 100 may comprise sprockets for engaging the feed holes, thereby to obviate the possibility of any slippage. Between the recording head 46′ and the readout head 47′ is a loop L of the tape in which rides a roller 93 that controls the position of a tape lever 92. The length of the tape loop in the standby position of the system is such as to accommodate the facsimile message signals generated in the time of one full scanning line across a message sheet at the transmitter.

The closing of contacts 7 of the relay RCR of Fig. 1 applies current from the conductor 26 to conductors 70 and 70′ and energizes the magnet 42′ of Fig. 3 which attracts its armature and releases the slip clutch 38′, thereby allowing the tape drive roller 90 to rotate in the direction of the arrow to advance the magnetic tape T under the recording head 46′. The resulting increase in the length of the loop L of the tape causes a larger loop L′ to be formed between the recording head 46′ and the transmitting head 47′ and allows the tape arm 92 to drop, closing tape-arm contacts 94.

The next phasing pulse from the receiving station B of Fig. 1 will operate the relay RCT by the closure of a circuit from ground potential through a circuit including the armature 2 and contact 3 of relay RLR, contacts 4 of relay RCR, winding of RCT to negative potential on conductor 26. Relay RCT energizes and locks up through it contacts 1. The closure of contacts 4 of relay RTC causes negative battery from conductor 26 to be applied over conductor 72 through the now closed contacts 94 to energize the clutch magnet 74′. The operation of the armature of magnet 74′ releases the slip clutch 98, allowing the tape drive roller 100 to turn in the direction of the arrow and advance the magnetic tape under the retransmitting head 47′. The tape continues to advance under both heads 46′ and 47′ at the same speed, and the length of the tape loop L′ between these heads now represents one complete scanning line at the transmitting station A plus that portion of the scanning line by which the two facsimile machines at stations A and B are out of phase.

At the end of transmission and with the operation of the relay REM of Fig. 1, the closure of its contacts 1 applies negative battery from conductor 26 to a conductor 84 to operate a relay 102, Fig. 3; the energization of the armature of the magnet 102 opens the circuit 70' to the clutch magnet 42', and the armature and the clutch magnet engage the slip clutch 38' which stops the tape feed of the tape roller 90. The tape continues to move under the transmitting head 47' until the tight tape arm 92 is raised to a point where the contacts 94 are opened, which opens the circuit through the magnet 74' allowing its armature to engage the slip clutch 98 and preventing further rotation of the tape feed roller 100, stopping the tape under the transmitting head 47'. The tape control apparatus is now in condition for the next message. It is to be understood that the contacts 94 are provided with a means for fine adjustment of the time of opening of the contacts so that the standby length of the tape loop L can accurately be obtained to insure that it is equal to that required to accommodate the facsimile message signals generated in the time of one full scanning line across a message sheet at the transmitter. Pressure rollers 112 and 113 hold the tape taut over the erasing head 48' and feed roller 90.

When the end-of-message button 24 is depressed, the circuit through its contacts is opened and the power relay is deenergized, thereby removing the battery connections from all relays and also from the motor 32' of the tape control device.

While there are shown and described herein certain specific constructions embodying the features of the invention, it is to be understood that various changes and modifications may be made without departing from the spirit of the invention which is not to be regarded as limited except as indicated by the scope of the appended claims.

What is claimed is:

1. In a facsimile system in which a facsimile transmitter and a distant facsimile recorder may be operatively interconnected for transmission of messages over a communication circuit and in which the transmitter and recorder each transmits phasing pulses but are nonphasing with respect to each other, a phasing and repeating system comprising signal storage means including at least one signal recording track for receiving and providing intermediate storage of the facsimile message signals incoming from the transmitter and means including a reproducing member for scanning said track and retransmitting said stored signals to said facsimile recorder, and means jointly controlled by the phasing pulses received from the transmitter and recorder for causing said intermediate storage of the facsimile message signals to extend for a duration determined by the phase difference between the transmitter and recorder.

2. A system according to claim 1, in which said means jointly controlled by the received phasing signals cause said intermediate storage of the facsimile message signals to extend for a duration substantially equal to the time required by the scanning element of the facsimile transmitter to trace one scanning line across a message sheet plus the amount of time by which the phasing pulses from the recorder lag the phasing pulses from the transmitter.

3. In a facsimile system in which a facsimile transmitter and a distant facsimile recorder may be operatively interconnected for transmission of messages over a communication circuit and in which the transmitter and recorder each transmits phasing pulses but are nonphasing with respect to each other, a phasing and repeating system comprising signal storage means including a recording medium movable at a constant speed and having a signal storage track and a recording device for receiving and temporarily storing the facsimile message signals incoming from the transmitter and means including a reproducing device for reading out and retransmitting said stored signals to said facsimile recorder, and means jointly controlled by the phasing pulses received from the transmitter and recorder for changing the effective length of the storage track between said recording and reproducing devices to delay the reading out of the stored signals for an interval determined by the phase difference between the transmitter and recorder.

4. A system according to claim 3, in which said means jointly controlled by the received phasing signals cause the time required for a recorded signal on said storage track to travel from the recording device to the reproducing device to be substantially equal to the time required by the scanning element of the facsimile transmitter to trace one scanning line across a message sheet plus the amount of time by which the phasing pulses from the recorder lag the phasing pulses from the transmitter.

5. In a facsimile system in which a facsimile transmitter and a distant facsimile recorder may be operatively interconnected for transmission of messages over a communication circuit and in which the transmitter and recorder each transmits phasing pulses but are nonphasing with respect to each other, a phasing and repeating system comprising signal storage means including a movable storage medium having a magnetizable signal storage track and a recording device for receiving and temporarily storing the facsimile message signals incoming from the transmitter and means including a reproducing device for reading out and retransmitting said stored signals to the recorder, means for driving said storage medium at a constant scanning speed, means controlled by said phasing pulses for initiating the movement of said storage medium for recording facsimile message signals incoming from the transmitter, and other means controlled by certain of said phasing pulses for changing the effective length of the storage track between said recording and reproducing devices to delay the reading out of the stored signals for an interval determined by the phase difference between the transmitter and recorder.

6. A system according to claim 5, including means operative in the standby condition of the system for causing the effective length of said signal storage track extending between said recording and reproducing devices to be substantially equal to that required to accommodate the facsimile message signals generated in the time of one full scanning line across a message sheet at the transmitter, and said other means controlled by certain of said phasing pulses are operative to extend the effective length of the signal storage track between the recording and reproducing devices to that required to accommodate additional facsimile message signals generated by the transmitter during a time interval of a length determined by the phase difference between the transmitter and recorder.

7. A system according to claim 6, including means responsive to the cessation of said phasing pulses from the transmitter for restoring the effective length of the signal storage track to its said standby condition.

8. A system according to claim 6 in which said recording and reproducing devices are spaced from each other a distance such as to establish the effective length of said signal storage track in the standby condition of the system, and including means controlled by certain of said phasing pulses for increasing the spacing between the recording and reproducing devices to thereby increase the effective length of the signal track to compensate for the phase difference between the transmitter and recorder.

9. A system in accordance with claim 6 in which the signal storage medium is a circular rotatable member having a magnetizable surface and the recording and reproducing devices are arcuately spaced around the storage medium, and including means controlled by certain of said phasing pulses for increasing the arcuate spacing between the recording and reproducing devices to compensate for the phase difference between the transmitter and recorder.

10. A system in accordance with claim 6, in which the signal storage medium comprises a magnetic tape, means operative in the standby condition of the system for forming an initial loop of the tape between the recording and reproducing devices having a length substantially equal to that required to accommodate the facsimile message signals generated in the time of one full scanning line across a message sheet at the transmitter, and said other means controlled by certain of the phasing pulses are operative to increase the length of said loop to that required to accommodate additional facsimile message signals generated by the transmitter during a time interval of a length determined by the phase difference between the transmitter and recorder.

11. A system according to claim 9 in which said recording device remains in fixed position, and said reproducing device is rotated in an arcuate path away from the recording device a distance sufficient to compensate for the phase difference between the transmitter and receiver, and means responsive to the cessation of phasing pulses from the transmitter for rotating the reproducing device back to its initial position in the standby condition of the system.

12. A system according to claim 10, comprising tape control means including a first tape feed roller adjacent to the recording device and a second tape feed roller adjacent to the reproducing device for forming said initial loop of the tape and for advancing the tape during recording and reproducing operations, means controlled by said phasing pulses for rotating said first tape feed roller prior to the rotation of said second tape feed roller to increase the length of the tape loop to that required to accommodate said additional facsimile message signals, means for then rotating said second feed roller concurrently with the rotation of said first feed roller to advance the tape past the reproducing device to retransmit the stored signals, means operative to stop rotation of said first feed roller when retransmission of the stored signals has been completed, and means for causing said second feed roller to continue to rotate for an interval sufficient to reduce the tape loop to its initial standby length.

References Cited in the file of this patent

UNITED STATES PATENTS 2,256,364 Thompson -------------- Sept. 16, 1941
2,767,242 Ridings --------------- Oct. 16, 1956